US006422348B1

(12) United States Patent
Jujo et al.

(10) Patent No.: US 6,422,348 B1
(45) Date of Patent: Jul. 23, 2002

(54) TRANSMISSION WHEEL, METHOD FOR MANUFACTURING TRANSMISSION WHEEL AND SELF-WINDING WHEEL TRAIN STRUCTURE HAVING TRANSMISSION WHEEL

(75) Inventors: Koichiro Jujo; Mitsuru Ishii, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/582,912

(22) PCT Filed: Jan. 7, 1999

(86) PCT No.: PCT/JP99/00021

§ 371 (c)(1),
(2), (4) Date: Aug. 29, 2000

(87) PCT Pub. No.: WO99/35539

PCT Pub. Date: Jul. 15, 1999

(30) Foreign Application Priority Data

Jan. 7, 1998 (JP) .......................................... 10-001617

(51) Int. Cl.[7] ........................ F16H 55/00; G04B 27/00; F03G 1/08

(52) U.S. Cl. ......................... 185/39; 29/893.1; 74/143; 74/432; 368/148; 403/383

(58) Field of Search ............................... 29/893, 893.1, 29/893.2; 74/143, 432; 185/39; 368/148; 403/375, 383

(56) References Cited

U.S. PATENT DOCUMENTS

| | | | | | |
|---|---|---|---|---|---|
| 1,109,900 | A | * | 9/1914 | Coleman | 74/432 |
| 1,143,558 | A | * | 6/1915 | Templeton | 74/432 |
| 1,771,432 | A | * | 7/1930 | Cullman | 74/432 |
| 2,756,559 | A | * | 7/1956 | Derr | 368/148 |
| 3,306,025 | A | * | 2/1967 | Kocher | 368/148 |
| 3,628,325 | A | * | 12/1971 | Morita | 368/148 |
| 3,888,077 | A | | 6/1975 | Bachmann | 58/59 |

FOREIGN PATENT DOCUMENTS

| | | |
|---|---|---|
| CH | 1512570 | 1/1973 |

* cited by examiner

*Primary Examiner*—Allan D. Herrmann
(74) *Attorney, Agent, or Firm*—Adams & Wilks

(57) ABSTRACT

A transmission wheel comprises a gear having a hole and a pinion having a plurality of teeth and being removably mounted in the hole of the gear. The hole of the gear has at least one chord-shaped stop portion engaging two adjacent teeth of the pinion to prevent relative rotation between the pinion and the gear.

20 Claims, 8 Drawing Sheets

TRANSMISSION WHEEL, METHOD FOR MANUFACTURING TRANSMISSION WHEEL AND SELF-WINDING WHEEL TRAIN STRUCTURE HAVING TRANSMISSION WHEEL

BACKGROUND OF THE INVENTION

1. Field of the Invention

The present invention relates to a transmission wheel, to a method for manufacturing the transmission wheel, and to a self-winding wheel train, and more particularly to a transmission wheel which can be manufactured by a simplified process, a method for manufacturing the transmission wheel and a self-winding wheel train having the transmission wheel.

2. Background Information

FIG. 6 is a schematic top view showing a self-winding train wheel structure. FIG. 7 is a sectional view showing the self-winding train wheel structure shown in FIG. 6. This self-winding train wheel 500 is structured by an intermediate first transmission wheel 503 to transmit rotation of an oscillating weight 501 to a first reduction wheel 502 which transmits rotation of the intermediate first transmission wheel 503 to a pawl lever 504, the pawl lever 504 being supported at a shaft in an eccentric position of this first reduction wheel 502 and formed by a draw finger 5041 and a feed finger 5042, a second reduction wheel & pinion 600 whose rotation is regulated in one direction by the pawl lever 504 to transmit rotation to a ratchet wheel 505, the ratchet wheel 505 being in engagement with a barrel complete stem 5071 of a barrel complete 507. The rotation of the ratchet wheel 505 is transmitted to the barrel complete 507 to store power on a spiral spring provided therein. The second reduction wheel & pinion 506 is rotatably supported at a shaft by a barrel complete bridge 551 and a second transmission bridge 552. The second reduction wheel & pinion 600 is arranged at an underside of the ratchet wheel 505. This is to reduce the thickness of the timepiece movement.

If the oscillating weight 501 rotates due to a movement of a user's arm, the rotation is transmitted to the first reduction wheel 502 through the intermediate first transmission wheel 503. Regardless of the rotational direction of the first reduction wheel 502, the second reduction wheel & pinion 600 rotates in one direction due to action of the draw finger 5041 and feed finger 5042. The rotation of the second reduction wheel & pinion 600 is transmitted to the ratchet wheel 505 through a second transmission pinion 602. The rotation of the ratchet wheel 505 winds the spiral spring of the barrel train 507.

FIGS. 8(*a*)–8(*b*) are explanatory views showing parts forming a conventional second reduction wheel & pinion. This second reduction wheel & pinion is structured by two members of a gear 601 (FIG. 8(*a*)) and a pinion 602 (FIG. 8(*b*)). The gear 602 has saw-formed teeth 611 for engagement with a pawl lever 504. The gear 601 has at its center part a hole part 612 for receiving the pinion 602 therein. The hole part 612 is provided with stop parts 613. Also, the pinion 602 has shaft parts 621, 621 at its respective ends. Furthermore, a pinion part 622 is made in a two-stage form. The pinion 602 is provided with teeth 622*a* at the smaller diameter part and teeth 622*b* at the larger diameter part. Furthermore, the small diameter part of the two-staged part is provided with a cutout 623. This smaller diameter part 622*a* is fitted in the hole part 612 of the gear 601. The cutouts 623, 623 engage the stop parts 613, 613 to suppress rotation between the gear 601 and the pinion 602. Also, the gear 601 and the pinion 602 are freely removable.

To manufacture a gear 601, first a plate material is blanked by pressing to obtain a disk member. Next, teeth 611 are formed in a peripheral edge of this disk member. A hobbling machine is used for forming the teeth 611. A hole part 612 is formed by a compound dice simultaneously with blanking a disk member. Meanwhile, in the manufacture of a pinion 602, first a shaft 621 and two-staged pinion 622 are formed by a lathe. Next, the pinion 602 is removed from the lathe and attached on a milling machine to form cutouts 623 by milling. Also, the cutouts 623 may be formed by attaching on a forging machine. The pinion 602 is cut with teeth throughout the pinion part by the hobbling machine.

Upon shipping the movement, release of the spiral spring is made to conduct inspection for accuracy of the movement (date difference, for a self-winding watch). Specifically, the ratchet wheel 505 is rotated to make the spiral spring to be fitted in the barrel complete 507 into a fully wound state. One rotation of the barrel complete 507 requires 7 hours. Due to this, the ratchet wheel 505 is wound back by about 3.4 turns in order to obtain rotation of 1 day (24 hours). If the ratchet wheel 505 is wound back, the rotation of the ratchet wheel 507 is transmitted to a not-shown second wheel and third wheel, thus rotating a second hand and minute hand. An hour hand obtains rotation from a hour pinion of the second wheel through an hour wheel. Then, the second hand is measured for deviation at a time of the ratchet wheel 505 is wound back.

In the meanwhile, if the ratchet wheel 505 is to be wound back in a state the ratchet wheel 505 and the second reduction wheel & pinion 600 are in engagement with, the pawl lever 504 would be put into an engagement state with the second reduction wheel & pinion 600, thus making difficult to perform winding back. Due to this, in order to release the engagement between the ratchet wheel 505 and the oscillating weight 501, the second transmission bridge 552 shown in FIG. 7 is removed to remove the pinion 602 of the second reduction wheel & pinion 600 from the gear 601. This releases the engagement between the ratchet wheel 505 and the second reduction wheel & pinion 600 and the ratchet wheel 505 is allowed to freely rotate. Thus, accuracy inspection can be effectively conducted.

In the conventional second reduction wheel & pinion 600, the wheel 601 and the pinion 602 are made in a separate structure so that in an inspection process the pinion 602 can be removed from the gear 601. In an assembling state, engagement is made for the stop parts 613 of the hole part 612 with the cutouts 623 of the pinion 622 to thereby conducting positioning in a rotational direction. Meanwhile, in manufacturing a pinion 602, a staged pinion 622 is cut with using a lathe and the pinion 602 is relocated onto a milling machine to cut cutout parts 623. Furthermore, teeth cutting is made including the smaller diameter part 622*a* to be fitted in the gear 601. Also, the gear 601 together with the hole part 612 is blanked by a press into a disk form, followed by teeth cutting by a hobbling machine.

However, there has been a problem that the manufacture of a second reduction wheel & pinion 600 in the above manner results in increase of manufacture process steps. Therefore, it is an object of the present invention to provide a transmission wheel that the manufacture process is to be reduced and method for manufacturing a same transmission wheel and a self-winding train wheel structure.

In order to achieve the above object, a transmission wheel according to the present invention has a structure having a pinion removably fitted in a hole part formed in a gear. An engagement part comprised of a string part or a chord-shaped stop portion with which teeth of the pinion engages is formed integral with the hole part of the gear. The pinion is fitted and assembled in the hole part of the gear such that teeth of the pinion and the engagement part are brought into engagement.

Conventionally, the gear and the pinion have been positioned with a cutout part and a stop part put in engagement. However, in this invention positioning is conducted utilizing teeth of a gear. That is, the gear is provided with an engagement part in a hole part so that teeth of a pinion is engaged with this engagement part. By doing so, the pinion can be omitted to re-form for a cutout part or the like.

A transmission wheel according to the present invention has a structure having a pinion removably fitted in a hole part formed in a gear, the hole part of the gear being formed in a drum form, and a string part or a chord-shaped stop portion of the drum form being given a dimension to abut against nearly a top of two adjacent teeth of the pinion, wherein the pinion is engaged with the gear by abutting the adjacent two teeth against the string part.

The gear is provided, in a hole part, with a string part with which teeth of the pinion are engaged through abutment. In this invention, the gear requires only to open a hole part in a drum form having a string part in one part thereof. The pinion does not require re-forming.

A transmission wheel according to another embodiment of the invention has a structure arranged at an underside of a ratchet wheel and having a gear and a pinion that are removably fitted, said gear being formed with a hole part generally in a circular form in which the pinion is to be inserted, and the hole part being integrally formed with string parts or chord-shaped stop portions to abut against adjacent two teeth of the pinion, wherein the pinion is engaged with the gear by abutting the adjacent two teeth against the string parts.

If the string part is integrally formed with an opening part upon opening thereof, the gear requires only hole opening. If the string part is made in a same size abutable against teeth of the pinion, labor and time for re-forming the pinion is to be omitted.

A transmission wheel according to another embodiment of the invention has a structure arranged at an underside of a ratchet wheel and having a gear and a pinion that are removably fitted, said gear being formed with a hole part generally in a circular form in which the pinion is to be inserted, and the hole part being integrally formed with one string part or chord-shaped stop portion to abut against adjacent two teeth of the pinion, wherein the pinion is engaged with the gear by abutting the adjacent two teeth against the string part.

This invention is structurally provided with one string part in the hole part so that two teeth of the pinion are abutted against the string part. This also enables full engagement between the gear and the pinion, making unnecessary to re-form a pinion.

A transmission wheel according to another embodiment of the invention has the hole part having as the engagement part three or more string parts or chord-shaped stop portions, wherein the gear and the pinion are fitted and assembled such that adjacent two teeth of the pinion are abutted against each of the string part.

That is, if adjacent two teeth of the pinion are abutted against the string part and engaged with the gear, the string part may be three or more in number. This makes it possible to engage between the gear and pinion without re-forming the pinion.

A method for manufacturing a transmission wheel according to the present invention includes: a pinion manufacturing process of manufacturing a pinion by subjecting a gear forming process to a shaft member having a step part; a gear manufacturing process of manufacturing a gear by opening a hole part at a center part for engagement with the pinion and integrally forming in the hole part an engagement part having a string part or chord-shaped stop portion for engagement with teeth of the pinion; and an assembling process of fitting and assembling the gear and the pinion such that teeth of the pinion are put into engagement with the engagement part.

Conventionally, where manufacturing a transmission wheel of a separable structure, a gear and a pinion are made. A cutout part is provided in the pinion cut with teeth to engage between the cutout part and stop part provided in the hole part of the gear. In this invention, however, an engagement part for engagement with pinion teeth is formed integral with a hole part of the gear, omitting the forming process for the cutout part. This simplifies the manufacture process for the transmission wheel.

An automatic train wheel structure according to the present invention comprises: a first reduction wheel obtaining rotation from an oscillating weight, and a second reduction wheel supported at a shaft in an eccentric position of the first reduction gear wherein engaged with a gear upon swing only in one direction are a pawl lever to seeing a draw finger and feed finger due to rotation of the first reduction wheel to obtain a rotation force in one direction, and a hole part opened in the gear being removably fitted with a pinion; and a ratchet wheel engaging the pinion of the second reduction wheel to obtain rotation and arranged at an upper side of the second reduction wheel; wherein in an inspection process the pinion is separated from the gear to release mesh between the ratchet wheel and the second reduction wheel, the automatic train wheel characterized by: a hole part opened in the gear of the second reduction wheel is integrally formed with an engagement part that teeth of the pinion engage.

When, opening a hole part in the gear of second transmission wheel, an engagement part for engagement with pinion teeth is integrally formed. Other forming than tooth cutting is not made on the pinion. This simplifies the manufacture process for a second transmission wheel, thereby simplifying the structure of the automatic train wheel structure.

DETAILED DESCRIPTION OF THE PREFERRED EMBODIMENTS

Hereunder, the present invention will be explained in detail with reference to the drawings. Incidentally, the invention is not limited to by the embodiments.

(Embodiment 1)

Figure 1:
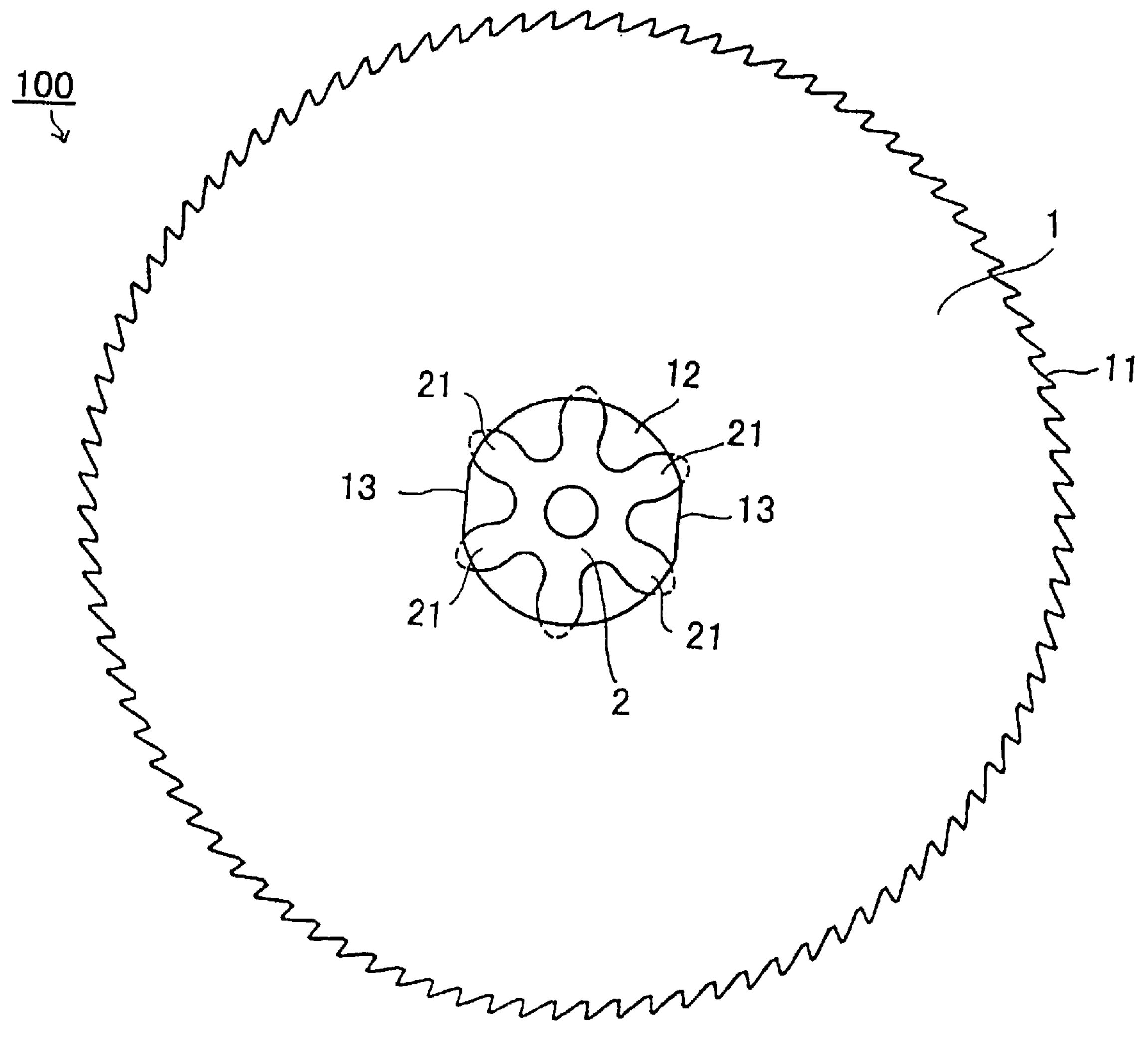
FIG. 1 is an explanatory view showing a second reduction wheel & pinion according to Embodiment 1 of the invention.
Figure 2A:
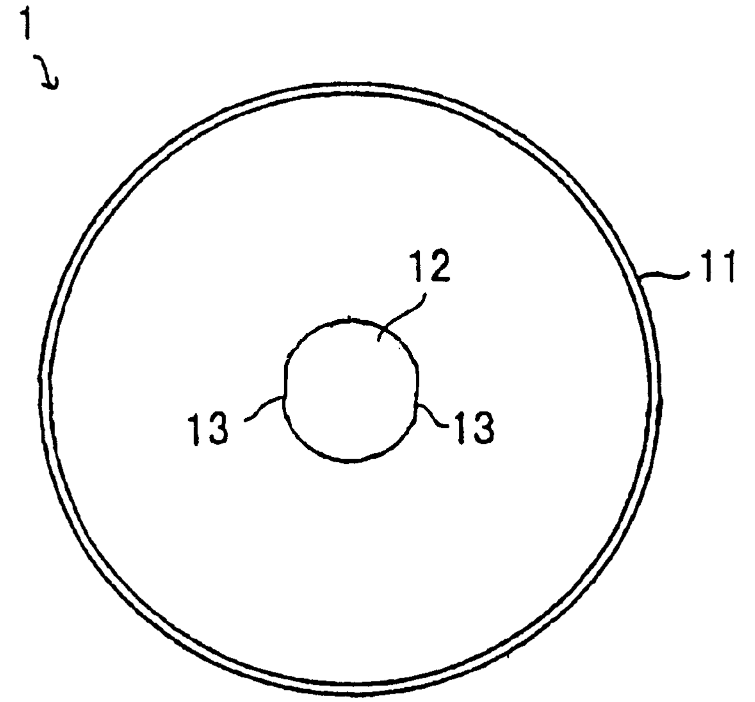
FIG. 2 is an explanatory view showing parts constituting the second reduction wheel & pinion shown in FIG. 1.
Figure 2B:
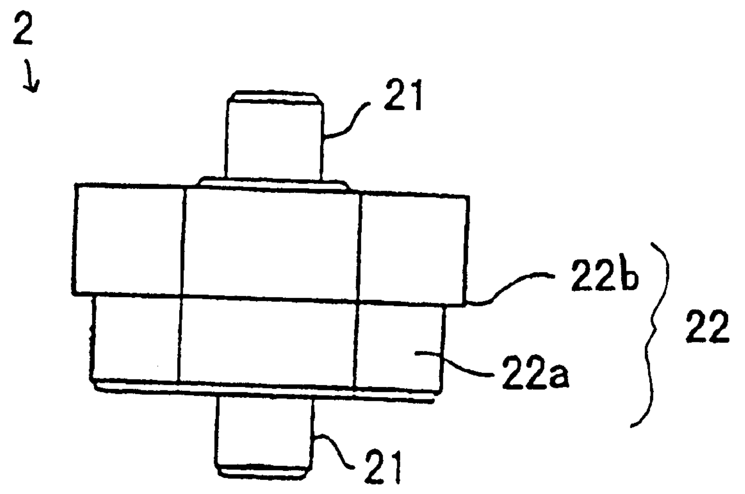

FIG. 1 is an explanatory view showing a second reduction wheel & pinion according to Embodiment 1 of the invention. FIG. 2 is an explanatory view showing parts constituting the second reduction wheel & pinion shown in FIG. 1. This second reduction wheel & pinion 100 is structured by two members of a gear 1 (FIG. 2(*a*)) and a pinion 2 (FIG. 2(*b*)). The gear 1 has saw-formed teeth 11 for engagement with a pawl lever. The gear is opened, at its center part, with a hole part 12 in which a pinion 2 is to be assembled. The hole part 12 is provided with two chord-shaped or string-formed stoppers or stop portions or parts 13. The stop parts 13 are integrally formed in an opening process for the hole part 12. The pinion 2 has shaft parts 21 at its respective ends. Furthermore, a pinion part 22 is a in a two-stage form. The pinion 2 is provided with teeth 22*a* at the smaller diameter part and teeth 22*b* at the larger diameter part. This smaller diameter part is fitted in the hole part 12 of the gear 1. The stop part 13 has a string length nearly equal a spacing between adjacent two teeth 22*a*, 22*b*, specifically a spacing between opposite tooth surface tip ends. When fitting the pinion 2 in the gear 1, the stop part 13 is rendered positioned between adjacent two teeth 22*a*, 22*b*. This engages teeth 22*a*, 22*b* of the pinion 2 with stop part 13 thereby suppressing the gear 1 and the pinion 2 from rotating in a circumferential direction. Also, the gear 1 and the pinion 2 are removable.

To manufacture the gear 1, a plate material is first blanked by pressing to obtain a disk member. Next, teeth 11 are formed in a peripheral edge of the disk member. A hobbling machine is used in forming teeth 11. The hole part 12 is formed by a compound dice simultaneous with blanking the disk member.

Also, together with the hole part 12 stop parts 13, 13 are integrally formed. Also, in manufacturing the pinion 2, first the shaft parts 21 and two-staged pinion part 22 are formed by a lathe. Next, teeth are formed on the pinion 2 throughout the pinion part by the hobbling machine.

Figure 6:
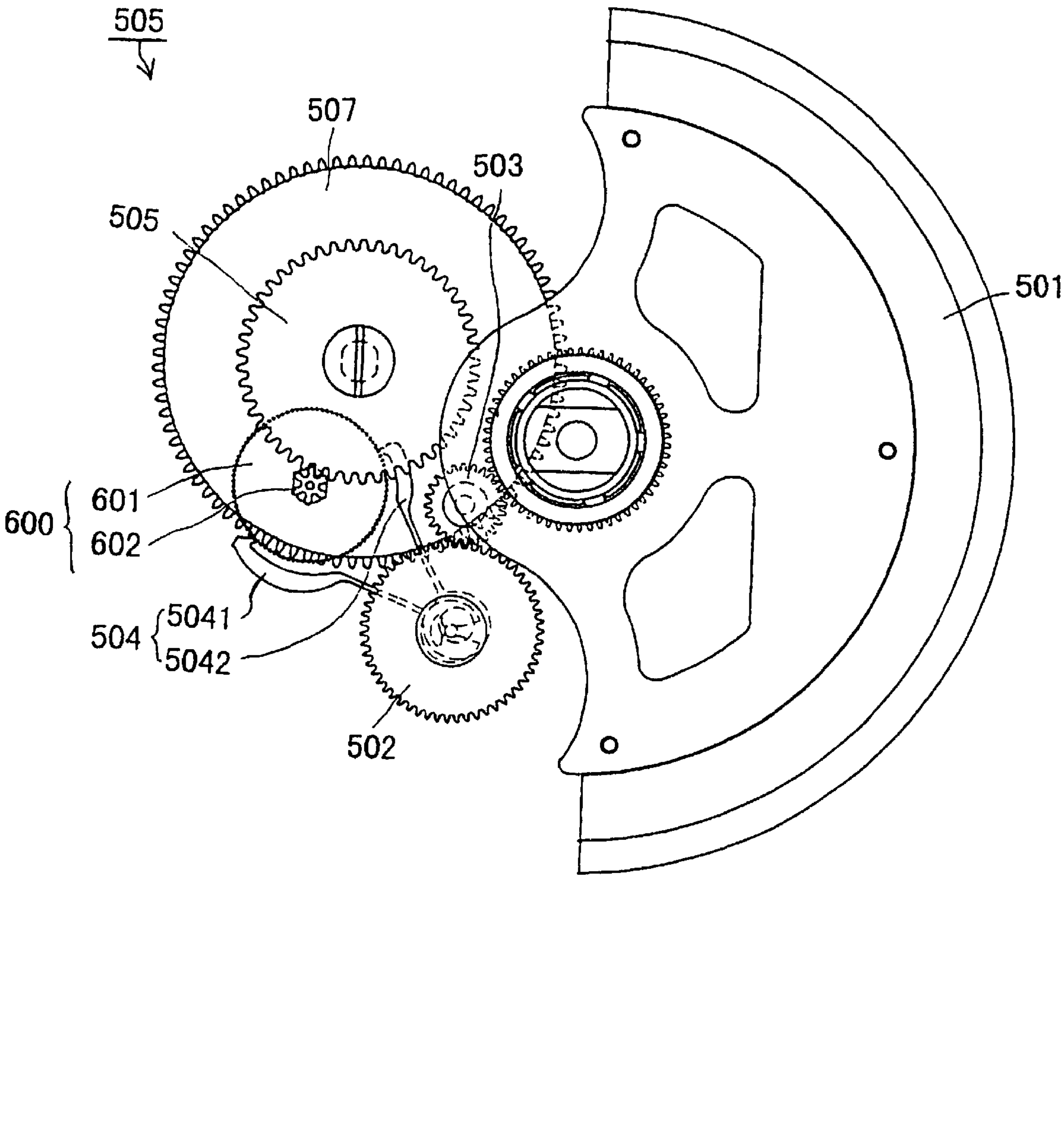
FIG. 6 is a schematic top view showing an automatic train wheel structure.
Figure 7:
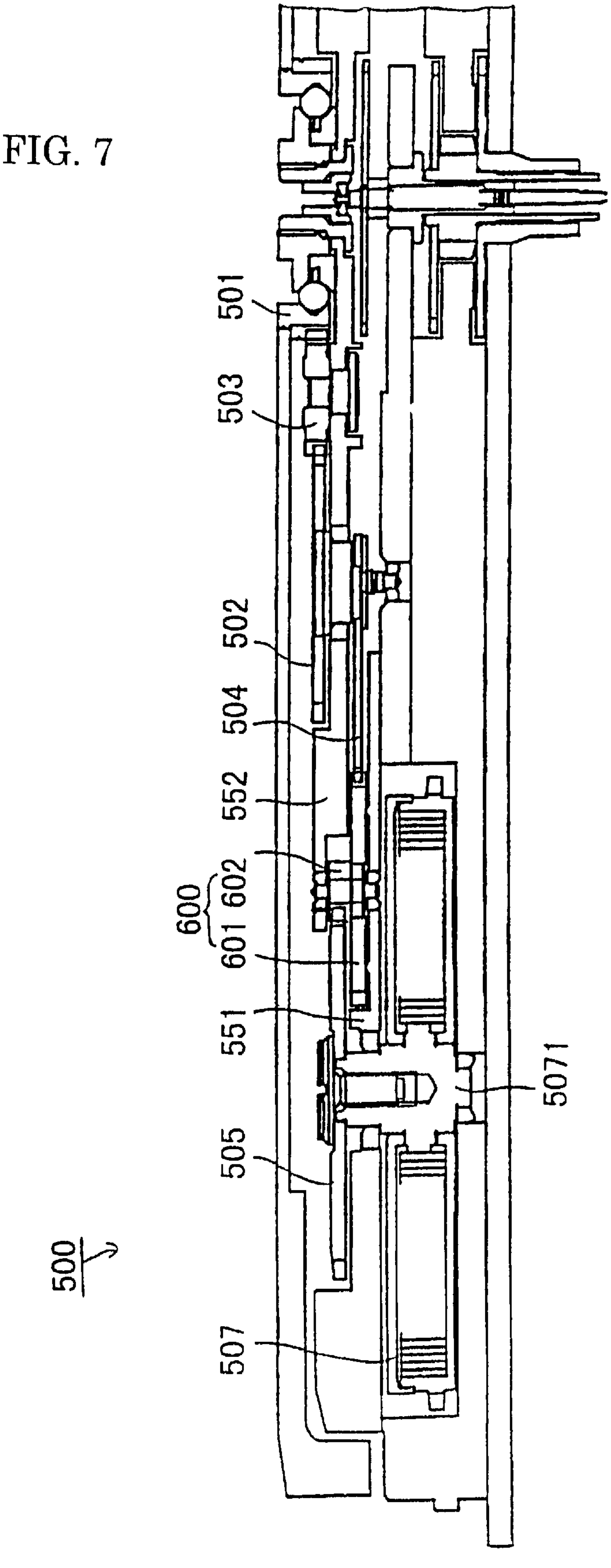
FIG. 7 is a sectional view showing the automatic train wheel structure shown in FIG. 6.
Figure 8A:
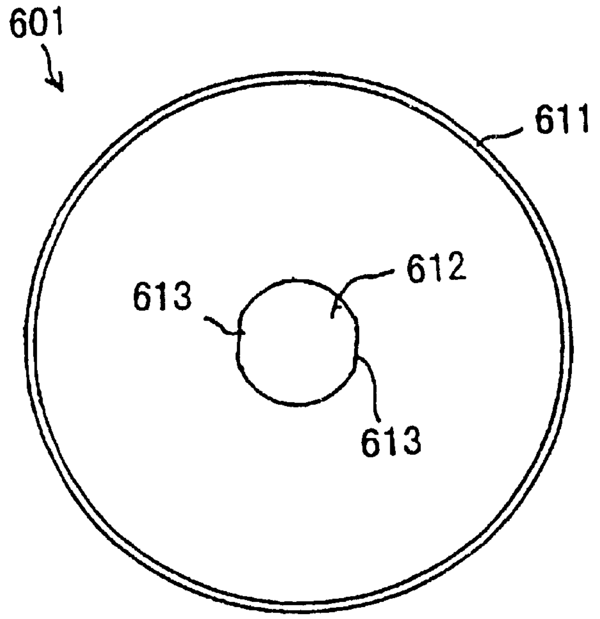
PRIOR ART FIG. 8(a)
FIGS. 8(*a*) and 8(*b*) are explanatory views showing parts constituting a conventional second reduction wheel & pinion.
Figure 8B:
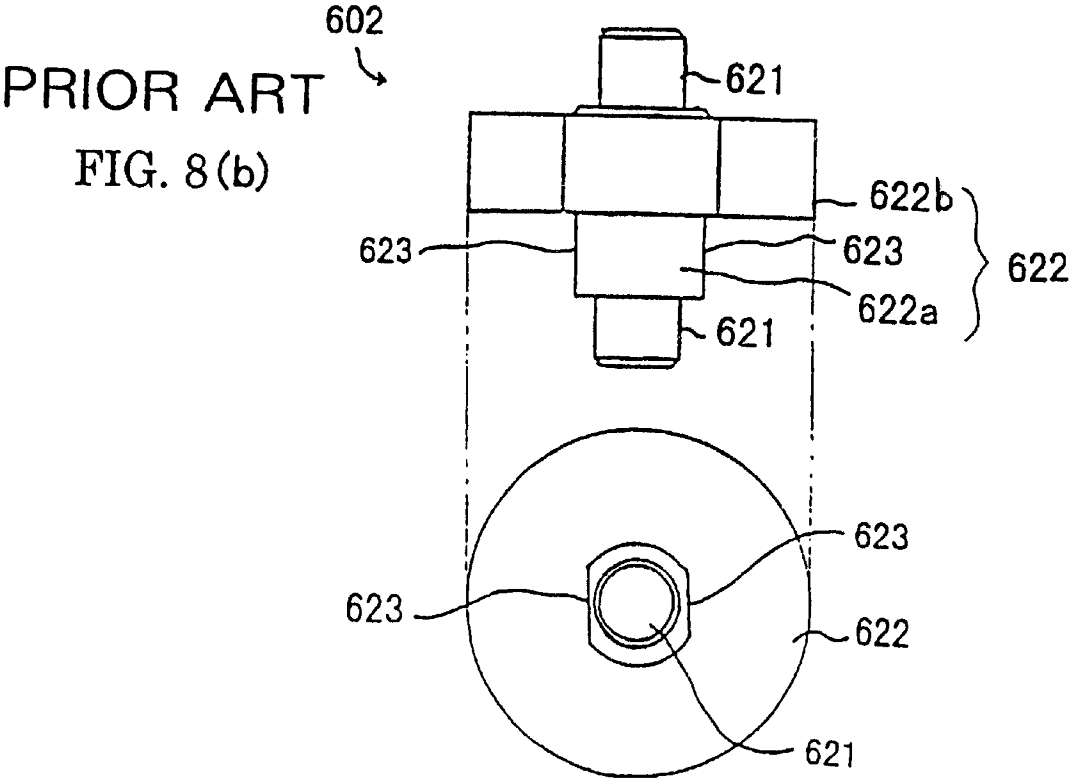
PRIOR ART FIG. 8(b)

The automatic train wheel using this second reduction wheel & pinion 100 is as shown in FIG. 6 and FIG. 7, omitting explanation thereof. Incidentally, although the above embodiment described on the case with a pinion having 6 teeth, the invention is not limited to this. For example, even in a case of 8 teeth for example, the stop part on the gear side may be determined in string length as an interval of tooth tip faces of adjacent teeth.

(Embodiment 2)

Figure 3:
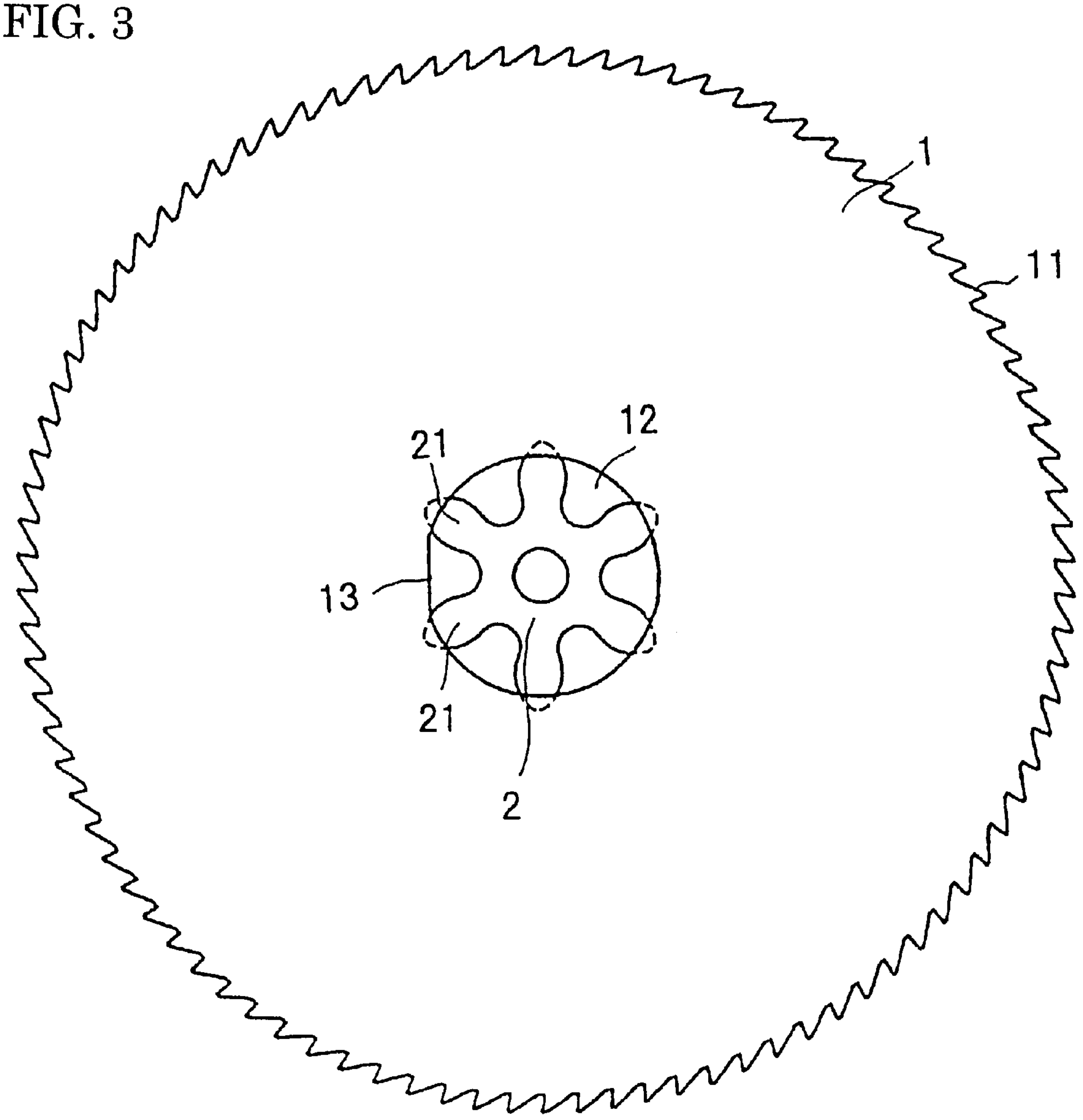
FIG. 3 is an explanatory view showing a second reduction wheel & pinion according to Embodiment 2 of the invention.

FIG. 3 is an explanatory view showing a second reduction wheel & pinion according to Embodiment 2 of the invention. The second reduction wheel & pinion 200 according to Embodiment 2 of the invention has only one stop part 13 provided in a hole part 12. The stop part 13 has a string length almost equal to a spacing between opposite tooth tip faces of pinion teeth 21, 21, similarly to the above. When fitting a pinion 2 in a gear 1, the stop part 13 is positioned between adjacent two teeth 21, 21. In the case of one stop part 13, it is satisfactory to suppress rotation in a circumferential direction between the gear 1 and the pinion 2. The other structures are generally similar to Embodiment 1 and explanation thereof is omitted.

(Other Embodiments)

Figure 4:
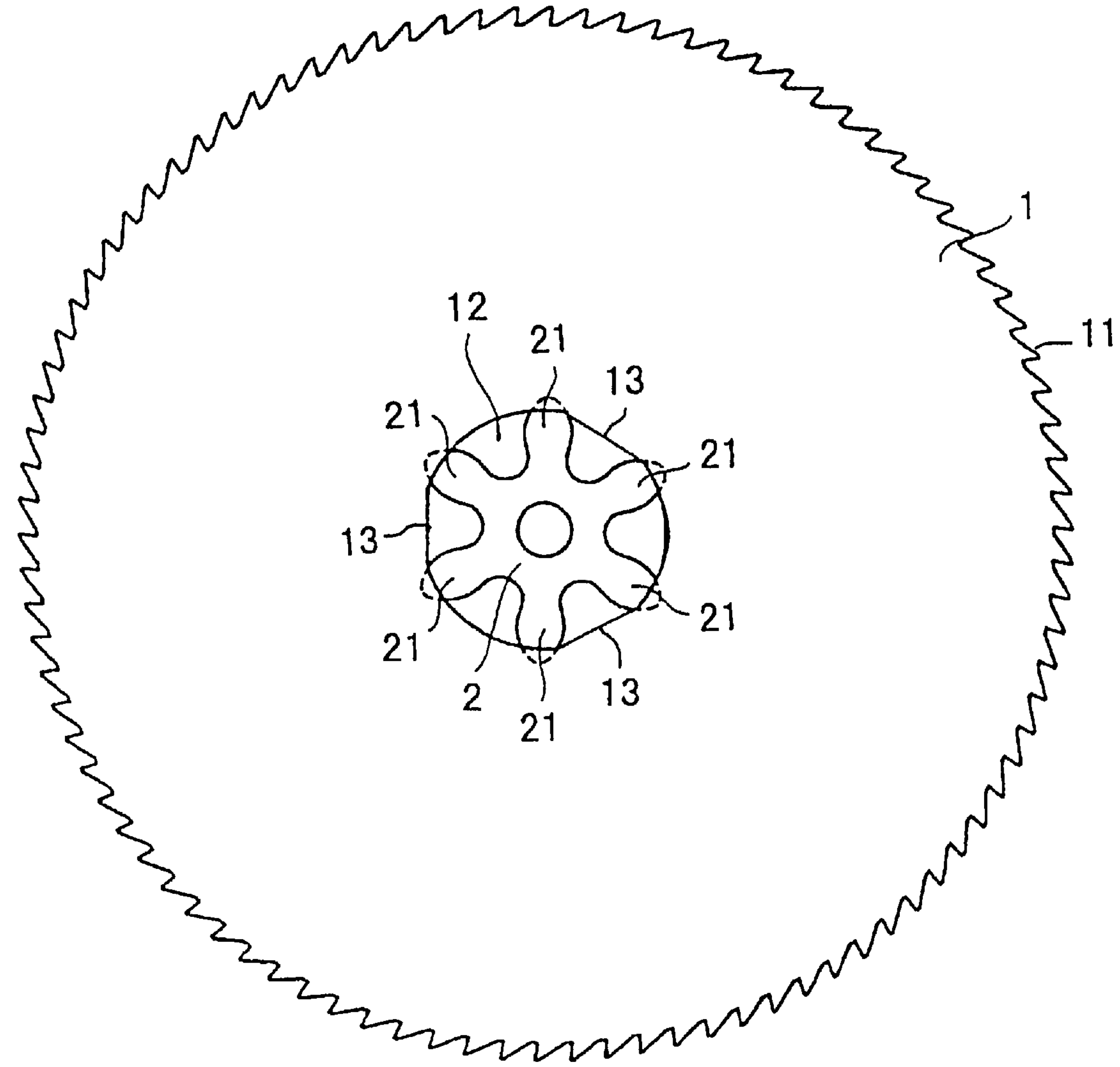
FIG. 4 is an explanatory view showing a second reduction wheel & pinion according to another embodiment of the invention.
Figure 5:
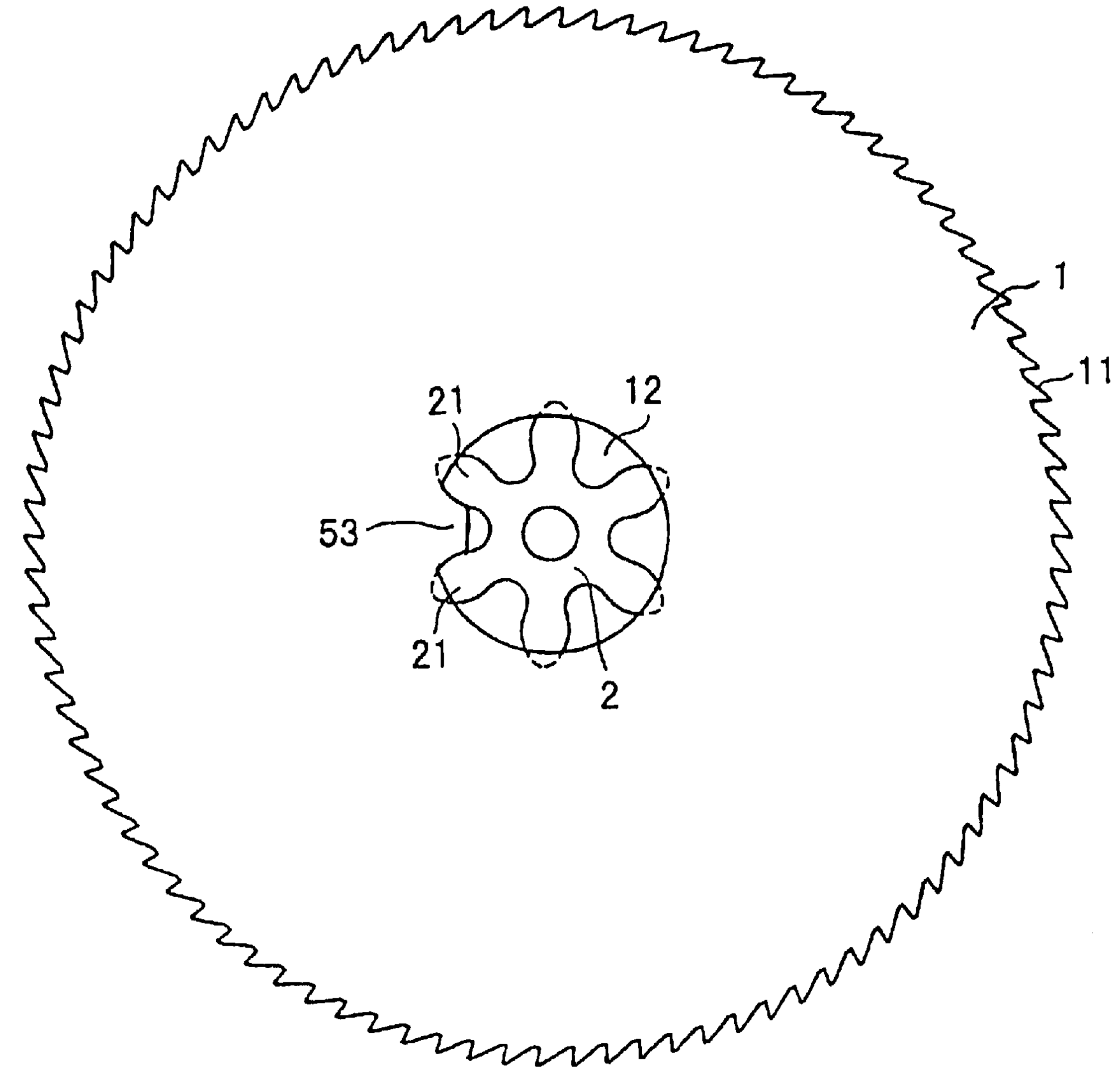
FIG. 5 is an explanatory view showing a second reduction wheel & pinion according to another embodiment of the invention.

Also, as shown in FIG. 4 the stop part 13 may be provided three in number. If provided plurality, the integral formation with the hole part 12 will not increase the processes of manufacture. Also, the stop parts 13 may be provided four or more in number. Also, as shown in FIG. 5 an engagement part 53 may be provided that is in a particular form to engage the teeth of pinion 2.

Industrial Applicability

As explained above, the transmission wheel of the invention is provided with an engagement part having a string part in the gear hole part thereof to engage pinion teeth with the engagement part. Accordingly, labor and time is omitted in forming cutout part or the like in the pinion. This simplifies the process of manufacture for the transmission wheel.

More specifically, the transmission wheel of the invention has a gear hole part provided with a string part against which adjacent pinion teeth are abutted, making it unnecessary to re-form the pinion. This simplifies the process of manufacturing the transmission wheel.

The transmission wheel of the invention has a gear string part integrally formed upon opening the hole part, requiring only opening a hole in the gear. This omits labor and time of re-forming the pinion, simplifying the process of manufacture.

The transmission wheel of the invention has a gear provided with a hole part provided with one string part against which two pinion teeth ar abutted. Because this also provides sufficient engagement between the gear and the pinion, the transmission wheel can be manufactured in a simple structure and the pinion is not required to re-form similarly to the above. This simplifies the process of manufacture for the transmission wheel.

In the transmission wheel of the invention, a gear provided with a hole part is provided with three or more string parts so that, upon assembling, adjacent two teeth are abutted against each of the string parts. This also makes it unnecessary to re-form the pinion similarly to the above, simplifying the process of manufacture for the transmission wheel. Also, because the gear and the pinion is held by abutment at three points or more, they can be engaged firmly.

In the manufacturing method for a transmission wheel according to the invention, an engagement part having a string part with which the pinion teeth are engaged is integrally formed with the gear hole part, thus omitting the process of forming the cutout part. This simplifies the process of manufacturing the transmission wheel.

The automatic train wheel structure according to the invention has an engagement part for engagement for pinion teeth which is integrally formed upon opening the opening part in the gear of the second reduction wheel & pinion constituting the automatic train wheel. The pinion is not subjected to nothing other than tooth cutting. This generally simplifies the process of manufacturing the second reduction wheel & pinion and hence the structure of the automatic train wheel structure.

What is claimed is:

1. A transmission wheel comprising: a pinion having a plurality of teeth; and a gear having a hole in which the pinion is mounted, the hole having at least one chord-shaped stop portion disposed between two adjacent teeth of the pinion, the chord-shaped stop portion having opposite ends each abutting against a portion of a respective one of the two adjacent teeth of the pinion to prevent relative rotation between the pinion and the gear.

2. A self-winding wheel train comprising: a transmission wheel according to claim 1; and a ratchet wheel in meshing engagement with the pinion of the transmission wheel for rotation therewith.

3. A transmission wheel according to claim 1; wherein the at least one chord-shaped stop portion comprises a plurality of chord-shaped stop portions each disposed between two adjacent teeth of the pinion, each of the chord-shaped stop portions having opposite ends each abutting against a portion of a respective one of the two adjacent teeth of the pinion to prevent relative rotation between the pinion and the gear.

4. A self-winding wheel train comprising: a transmission wheel according to claim 3; and a ratchet wheel in meshing engagement with the pinion of the transmission wheel for rotation therewith.

5. A transmission wheel according to claim 3; wherein the plurality of chord-shaped stop portions comprises at least three chord-shaped stop portions.

6. A transmission wheel according to claim 1; wherein each pair of adjacent teeth of the pinion are spaced-apart by a preselected distance; and wherein a length of the chord-shaped stop portion is substantially equal to the preselected distance.

7. A transmission wheel according to claim 1; wherein the plurality of teeth of the pinion comprises at least a first pair of adjacent teeth and a second pair of adjacent teeth; and wherein the at least one chord-shaped stop portion comprises first and second chord-shaped stop portions each engaging a respective one of the first and second pairs of adjacent teeth of the gear to prevent relative rotation between the pinion and the gear, the first chord-shaped stop portion having opposite ends each abutting against a portion of a respective one of the teeth of the first pair of adjacent teeth, and the second chord-shaped stop portion having opposite ends each abutting against a portion of a respective one of the teeth of the second pair of adjacent teeth.

8. A transmission wheel according to claim 5; wherein the first chord-shaped stop portion is generally parallel to the second chord-shaped stop portion.

9. A transmission wheel comprising: a gear having a hole at a central portion thereof, the hole having at least one chord-shaped stop portion; and a pinion having a plurality of teeth and being removably mounted in the hole of the gear with the chord-shaped stop portion of the hole engaging two adjacent teeth to prevent relative rotation between the pinion and the gear.

10. A transmission wheel according to claim 9; wherein the chord-shaped stop portion of the hole is disposed between the two adjacent teeth of the pinion.

11. A transmission wheel according to claim 9; wherein the chord-shaped stop portion has opposite ends each abutting against a portion of a respective one of the two adjacent teeth of the pinion.

12. A transmission wheel according to claim 9; wherein the two adjacent teeth are spaced-apart by a preselected distance; and wherein a length of the chord-shaped stop portion is substantially equal to the preselected distance.

13. A self-winding wheel train comprising: an oscillation weight for undergoing oscillating movement; a first reduction wheel for undergoing rotation in accordance with oscillating movement of the oscillation weight; a pawl lever connected to the first reduction wheel for undergoing pivotal movement in accordance with rotation of the first reduction wheel; a second reduction wheel having a gear and a pinion and being disposed in contact with the pawl lever for undergoing rotation in only one rotational direction, the gear having a hole having at least one chord-shaped stop portion, and the pinion having a plurality of teeth and being mounted in the hole of the gear with the chord-shaped stop portion of the hole engaging two adjacent teeth to prevent relative rotation between the pinion and the gear; and a ratchet wheel disposed in meshing engagement with the pinion of the second reduction wheel for rotation therewith.

14. A self-winding wheel train according to claim 13; wherein the chord-shaped stop portion of the hole is disposed between the two adjacent teeth of the pinion.

15. A self-winding wheel train according to claim 13; wherein the chord-shaped stop portion has opposite ends each abutting against a portion of a respective one of the two adjacent teeth of the pinion.

16. A self-winding wheel train according to claim 13; wherein the two adjacent teeth are spaced-apart by a preselected distance; and wherein a length of the chord-shaped stop portion is substantially equal to the preselected distance.

17. A method for manufacturing a transmission wheel, comprising the steps of: forming at a central portion of a gear a hole having at least one chord-shaped portion; providing a pinion having a plurality of teeth; and fitting the pinion in the hole of the gear so that the chord-shaped portion of the hole is disposed in contact with a pair of adjacent teeth of the pinion to prevent relative rotation between the pinion and the gear.

18. A method according to claim 17; wherein the fitting step includes the step of abutting opposite ends of the chord-shaped portion of the hole against a portion of a respective one of the pair of adjacent teeth.

19. A method according to claim 17; wherein the fitting step includes the step of disposing the chord-shaped portion of the hole between the pair of adjacent teeth.

20. A method according to claim 17; wherein the forming step comprises forming the hole with a plurality of chord-shaped portions; and wherein the fitting step comprises fitting the pinion in the hole of the gear so that each of the chord-shaped portions is disposed in contact with a respective pair of adjacent teeth.

* * * * *